Jan. 12, 1943.  P. R. HOOPES  2,308,420
COATING APPARATUS ADAPTED FOR CONFECTIONS
Filed Oct. 12, 1940  4 Sheets-Sheet 3
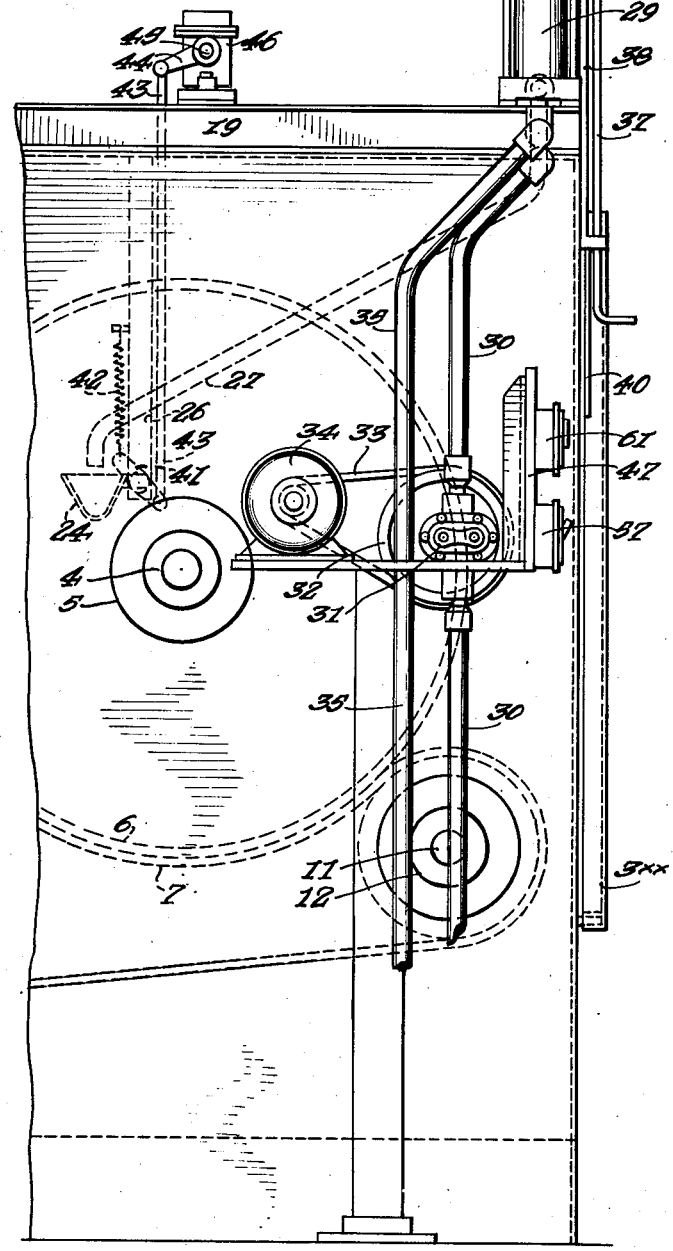
INVENTOR.
Penrose R. Hoopes
BY
H. Lee Helms Jan. 12, 1943. P. R. HOOPES 2,308,420
COATING APPARATUS ADAPTED FOR CONFECTIONS
Filed Oct. 12, 1940 4 Sheets-Sheet 4
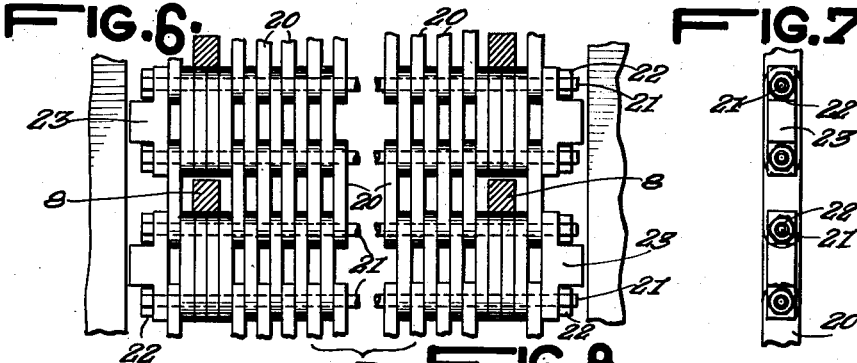
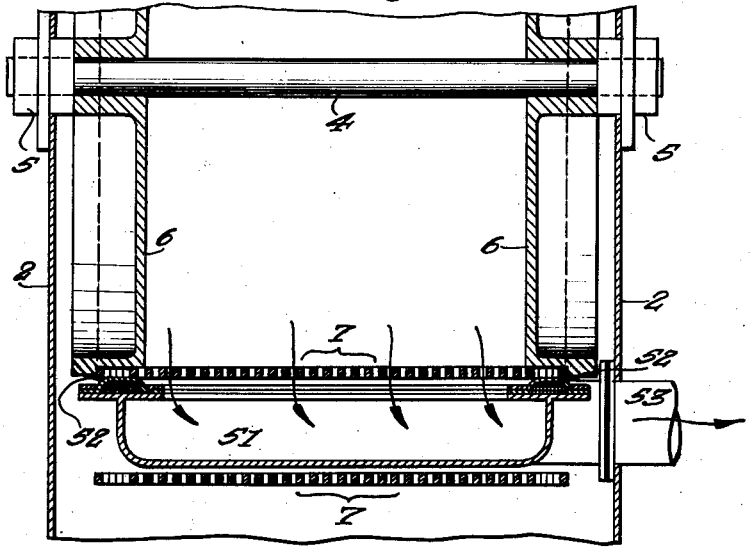
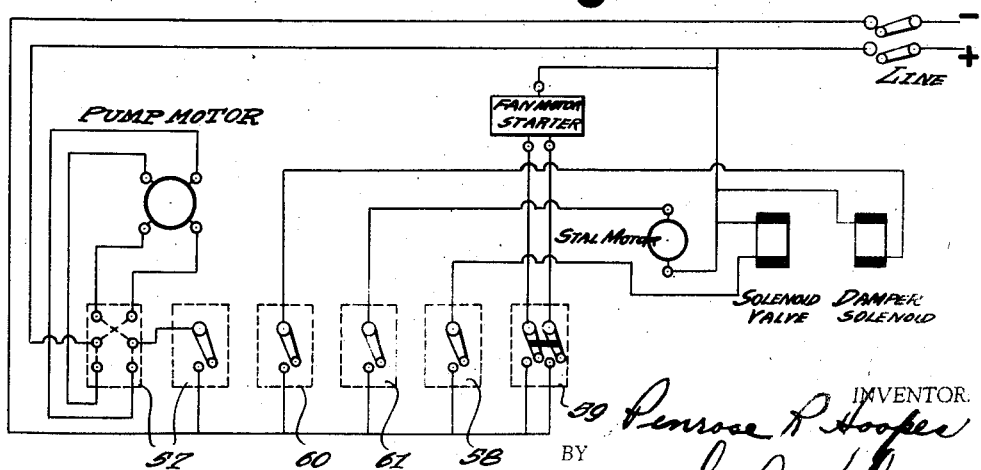

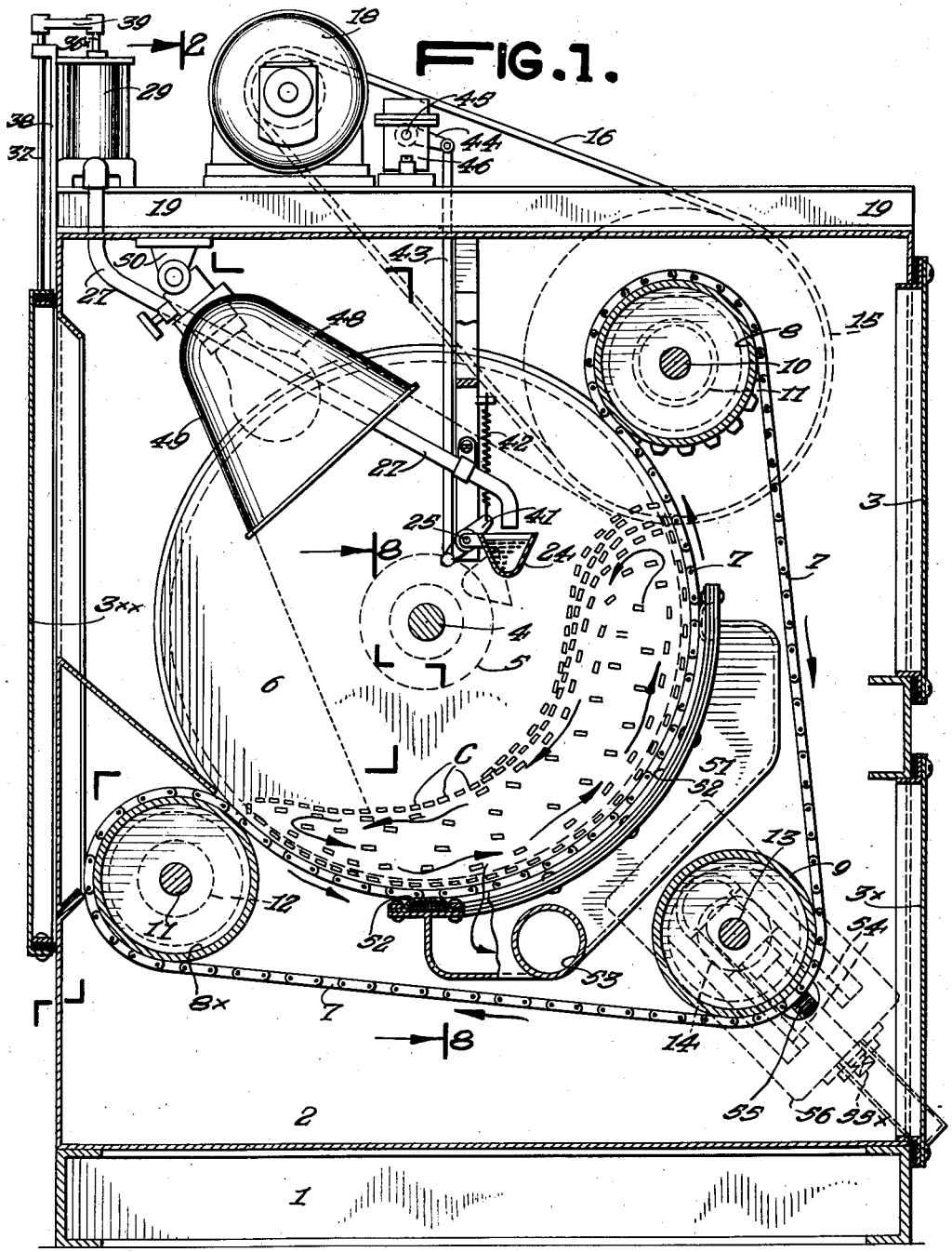

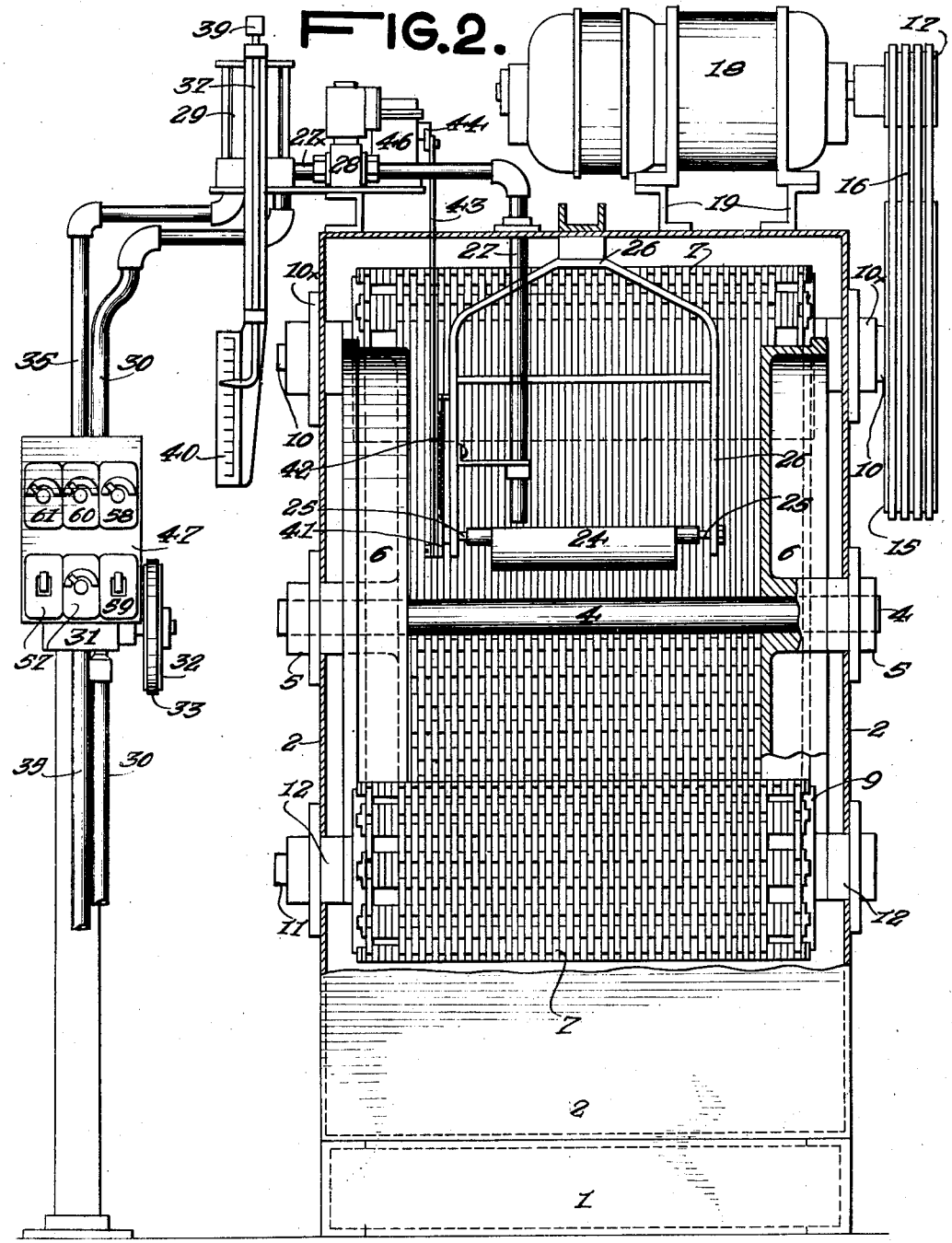

Patented Jan. 12, 1943

2,308,420

UNITED STATES PATENT OFFICE 2,308,420

COATING APPARATUS ADAPTED FOR CONFECTIONS

Penrose R. Hoopes, Philadelphia, Pa., assignor to American Chicle Company, Long Island City, N. Y., a corporation of New Jersey Application October 12, 1940, Serial No. 360,915

9 Claims. (Cl. 91—3)

This invention relates to apparatus for coating or enrobing confection units, such as the candy coating of chewing gum nuggets. In the past the apparatus customarily employed has comprised open-ended drums or pans rotating on an axis, in each case, inclined from the horizontal. The use of such apparatus involves losses of volatile ingredients and the charging of surrounding air with fine particles of sugar, there being other disadvantages also. The object of the present invention is to provide an apparatus which will more efficiently perform the coating operation and which may be sealed against the outward passage of volatile constituents and sugar particles, which will be more rapid in its action than apparatus customarily in use, and which will be capable of better control.

The invention will be described with reference to the accompanying drawings, in which:

Figure 1 is a sectional elevation through an apparatus embodying the invention.

Figure 2 is a sectional elevation taken on the line 2—2, Figure 1.

Figure 3 is an end elevation, showing certain parts in dotted lines, the elevation being taken at the left-hand end of Figure 2 and being fragmentary.

Figure 4 is a vertical section through the syrup measuring device.

Figure 5 is a horizontal section on the line 5—5, Figure 4.

Figure 6 is an enlarged fragmentary view of the tumbling chains showing in section teeth of one of the sprocket drives therefor, each drive comprising two sprocket wheels which are in practice carried by a common shaft.

Figure 7 is a side elevation of the chain structure shown in Figure 6.

Figure 8 is a fragmentary sectional elevation taken on the line 8—8, Figure 1.

Figure 9 is a wiring diagram.

Referring to the drawings, I have shown at 1 a base support upon which rests a casing 2, the latter being provided with any suitable number of openings, normally closed by air-tight doors 3, 3x, 3xx.

Extending transversely within the casing 2 is a shaft 4 journalled in bearing members 5 and carrying the spaced flanged disk wheels 6.

A tumbling chain-belt 7 is so disposed that its side margins are firmly pressed upon the peripheral flanges of disk wheel 6 for a portion of the area of the latter which, in the present embodiment, is approximately half of the peripheral flange area, as shown in Figure 1. At each end of said flange abutted area of the accompanying chain-belt the latter is led over a sprocket drive comprising two spaced sprocket wheels, as indicated in Figure 6 with reference to Figure 1, the sprocket wheels being indicated at 8, 8x. After passing the sprocket wheels 8, 8x the chain-belt is led over an intermediate and adjustable idler drum 9.

The two sprocket wheels 8 are on a shaft 10 journalled in bearings 10x and the sprocket wheels 8x are on a shaft 11 suitably journalled in bearing members as indicated by the dotted lines 12, Figure 1. The adjustable idler drum 9 is carried by a shaft 13 suitably journalled in bearing members 14.

The drive for the tumbling chain-belt 7 comprises a pulley 15 connected by a belt or belts 16 with a drive pulley 17 carried by the shaft of a reversable motor 18, the latter being mounted upon a supporting frame 19 carried at the top of the casing 2.

Normally the motor will be driven in a direction effecting movement of the tumbling chain-belt according to the arrows adjacent the tumbling chain-belt, Figure 1.

The tumbling chain-belt receives directly thereon a body of units to be coated, the latter being indicated at C, Figure 1. These units are held in position by the belt and the inner faces of flanged drum disk 6. The belt may be constructed in any suitable manner but preferably in the manner shown in Figure 6 wherein rows of links 20, each link being apertured at its ends, are connected by pivot shafts 21. The latter are preferably threaded at their ends to receive nuts 22 abutting end blocks 23 through which the shafts 21 pass. The links are arranged in sets, the alternate sets being offset, as shown in Figure 6. At each end of the belt receiving apertures are provided for the teeth of the sprockets, as, for example, the teeth of sprockets 8, and for adequate contact with the teeth said apertures are bounded at the ends thereof with a plurality of links abutting each other throughout their opposed surfaces, as shown in Figure 6.

In the tumbling movement of the units to be coated, they are carried upwardly by the movement of the belt and drum disk 6 until at the top of the body of units the action of gravity thereon causes a downwardly tumbling action, the movement of the units being indicated by the arrows, Figure 1.

Means are provided for applying to the tumbling units measured quantities of sugar syrup or other coating material. To this end a pouring tray 24 is provided at its ends with pivot studs 25 by means of which the tray is pivotally held in a bracket member 26 depending from the top of the casing 2. In register with the open end of the tray 24 is a discharge pipe or feed member 27 leading upwardly through the casing and thence to a solenoid controlled valve 28 and from the valve by branch pipe 27x to the interior of a measuring chamber 29. The measuring chamber receives liquid coating material via pipe 30 from a source of supply (not shown).

Where gravitational flow of the coating liquid to the measuring chamber is not desired, pipe 30 may connect with a pump as indicated at 31, Figure 3, and the pump is shown connected with a drive pulley 32 driven by belt 33 leading to a motor 34.

The measuring chamber 29 may communicate with a third pipe 35 for outflow from the measuring chamber and which may normally be closed. When, however, it is desired to clear out or cleanse the measuring chamber and pipe connected therewith, pipe 30 may be disconnected from the source of supply and connected with a wash liquid and pump 31 operated to cause circulation of the wash liquid, as will be understood without further explanation.

For measuring volumes of coating liquids passing to the pouring tray 24, there is disposed within the measuring chamber 29 a piston 36 adapted to be moved up and down by a rod arrangement comprising the piston-carrying rod 36x, a manually movable rod 37 slidable relatively to the apertured ends of a bracket 38 and a cross connector 39 for the two rods.

As shown in Figure 2, rod 37 at its lower end is formed as a pointer to register with a scale 40.

Means are provided for controlling the pouring action so that it may be relatively slow and progressive. One pivot stud 25 for the pouring tray has fixed thereto a lever arm 41 which is engaged by a tension spring 42 normally holding the tray in liquid-receiving position, as shown in Figure 1. To the opposite end of lever arm 41 is connected a link 43 leading to an operating lever 44 fixed to a shaft 45 slowly rotated by a Stal or other slow motion motor.

The specific design of the slow motion motor 46, solenoid valve 28 and the pump 31, form no part of the present invention and hence these members are shown diagrammatically, they being well known in various mechanical arts.

Suitably mounted exterior the casing is an electrical switch control board 47 and in Figure 9 the switch members of the control board and the wiring circuit are diagrammatically shown and will be described hereinafter with respect to a statement of a suitable operation cycle. These operations include the application of the coating liquid to the tumbling units and the withdrawal of moisture from the coating liquid even distributed over the units by their tumbling action with or without the application of heated air by means of a heating element disposed within the casing.

In the present embodiment, the heating element is shown in the form of an electric lamp 48, Figure 1, enclosed within a reflector 49 for directing the rays downwardly onto the tumbling units, the lamp and reflector being adjustable on a bracket 50 to which they are pivoted. For moisture withdrawal, and withdrawal of sugar dust or other solid particles, and also for withdrawing volatilized flavoring, there is disposed below the area of the tumbling units and in close relation to the tumbling chain-belt a suction chamber 51. In some cases this chamber may be used as a pressure chamber for forcing a blast of dry air through the tumbling units but ordinarily it is employed as a suction chamber.

The suction chamber is formed with a curvilinear face area in conformity with the belt 7, and this marginal face area of the suction chamber preferably carries a suitable packing material at 52, Figures 1 and 8, to directly abut the belt. Communicating with the suction chamber 51 is an outlet pipe 53 leading to a fan (not shown) or other suction medium.

Means are employed for adjusting idler drum 9 and to that end the bearing members 14 for the drum shaft 13 are mounted in slideways indicated at 54, Figure 1. Connected to a member embracing the shaft is an adjusting screw 55 threaded in a fixed block 56. By turning the screw at its squared end 55x idler pulley 9 may be moved to remove slack from chain-belt 7. Usually two adjusting screws will be employed, one for each bearing member for shaft 13.

In the operation of the apparatus a suitable quantity of the uncoated units will be placed upon the tumbling chain-belt and the casing closed. Motor 18 will then be thrown into operation to drive the belt and the flanged drums 6 to effect a tumbling operation of the units. At this time, or prior thereto, pump motor 34 will be swung into action. This motor is reversable and switch 57, which is a two-way switch, will be closed to energize that side of the motor operative to drive the pump in a direction to force liquid coating material upwardly through pipe 30 into measuring chamber 29. Switch 58 controlling the solenoid valve 28 in pipe line 27, 27x, is then closed and the measured quantity of coating liquid will flow into pouring pan 24 upon opening of the valve. The fan (not shown) connected to suction chamber 51 is then thrown into operation by closing switch 59 and, if desired, a damper opening (the damper not being shown) may be effected by closing switch 60, this damper being in the casing at a suitable point to permit the inflow of air to the tumbling units.

When the pouring pan is filled with the coating liquid, switch 61 is closed to throw into action the Stal motor 46 and a slow pouring of the coating liquid over the tumbling units is effected. Where desired, the lamp 48 or other heating unit, may be thrown into action. Refilling of the measuring chamber and the pouring pan and operation of the Stal motor to pour the fresh supply of coating liquid, will be effected during the tumbling of the units and the action of the fan exhaust has secured the desired thickness of coating on the units and they are ready to be discharged from the casing. At this point door 3xx is opened and the reversable motor 18 thrown into counteraction to effect a movement of the belt 7 in a direction reverse to its normal movement, its upper length moving to the left, Figure 1. This action of the belt and drum 6 will discharge the coated units through door 3xx and into a suitable receptacle.

At the end of a day's operation, any coating liquid left in the measuring chamber and pipe 30 may be withdrawn by reversing motor 34 and causing counteraction from the normal of pump 31.

I prefer that the links 20 of the tumbling belt be constructed of plastic material although any suitable material may be employed.

It will be understood that various modifications in the form and arrangement of the elements illustrated in the drawings forming an embodiment of the invention therein shown, may be made without departing from the spirit of the invention.

Having described my invention, what I claim and desire to secure by Letters Patent, is as follows:

1. A coating apparatus adapted for confections, comprising a casing, an endless apertured belt carrier, rotary members supporting the belt in such manner that the upper inclined length is arranged with a concave portion adapted to receive and cause tumbling thereon of a plurality of units to be coated, means located adjacent the undersurface of the concave portion of the apertured belt carrier for passing a draft of drying air through the belt and through any tumbling units thereon, and means for imparting movement to the belt.

2. A coating apparatus constructed in accordance with claim 1 in which the belt is formed with a plurality of loosely connected links, links of the belt being spaced to enable passage of the air therethrough.

3. A coating apparatus constructed in accordance with claim 1, in combination with an air box having an upper surface closely related to the upper inclined length of the belt carrier, a conduit connected to the box and led out of the casing whereby the air under suction or air under pressure passes through the conduit by means exterior the casing.

4. A coating apparatus adapted for confections, comprising rotary members supporting a casing, an endless apertured belt carrier having spaced lengths, rotary members supporting the belt carrier in such manner that the belt carrier is led with an upwardly directed length arranged with a curve portion adapted to receive and cause tumbling of a plurality of units to be coated, means under and adjacent said upwardly directed length of the belt carrier for passing a draft of drying air through the belt and through any tumbling units thereon, means for imparting movement to the belt, a chamber within the casing and disposed above said upwardly directed length of the belt carrier for receiving a measured quantity of coating liquid, and means effecting the discharge from said chamber of said coating liquid onto the tumbling units.

5. A coating apparatus adapted for confections, comprising a casing, an endless apertured belt carrier, rotary members supporting the belt carrier with an upwardly directed length having a curve portion adapted to receive and cause tumbling a plurality of units to be coated, means adjacent the lower surface of said upwardly directed length of the belt for passing a draft of drying air through the belt and through any tumbling units thereon, means for imparting movement to the belt, a pouring pan pivotally supported within the casing above said upwardly directed length of the belt, a conduit leading to the pouring pan to a point exterior the casing and adapted to lead a coating liquid to the pan, and means for effecting a relatively slow pouring action of the pan.

6. A coating apparatus adapted for confections, comprising a casing, an endless apertured belt carrier, rotary means supporting the belt carrier with an upwardly directed length having a concave portion adapted to receive and cause tumbling of a plurality of units to be coated, means located adjacent the undersurface of the upwardly directed length of the belt for passing a draft of drying air through the belt and through the tumbling units thereon, means for imparting movement to the belt, a pouring pan pivotally supported within the casing above said upwardly directed length of the belt, a conduit leading to the pouring pan to a point exterior the casing and adapted to lead a coating liquid to the pan, means for effecting a relatively slow pouring action of the pan, a measuring chamber for the coating liquid in connection with said conduit, means for causing flow of coating liquid into said measuring chamber, and means for controlling the flow of liquid from the measuring chamber through the conduit to the pan.

7. A coating apparatus adapted for confections, comprising a casing, an endless apertured belt carrier, rotary means supporting the belt carrier with an upwardly directed length having a concave portion adapted to receive and cause tumbling of a plurality of units to be coated, means located adjacent the undersurface of the upwardly directed length of the belt for passing a draft of drying air through the belt and through the tumbling units thereon, means for imparting movement to the belt, a coating-liquid receiving and pouring device within the casing above said upwardly directed length of the belt, a conduit leading from said device, a measuring chamber connected with the conduit, an electrically actuated valve for controlling flow of liquid from the measuring chamber, an electrically actuated device for effecting the flow of coating-liquid from the pan to the tumbling units, a filling conduit leading to the measuring chamber, a return or discharge conduit leading from the measuring chamber and a pump device causing circulation of liquid through the measuring chamber and through said conduits in either one of two directions.

8. A coating apparatus adapted for confections, comprising a casing, an endless apertured belt carrier, rotary means supporting the belt carrier with an upwardly directed length having a concave portion adapted to receive and cause tumbling of a plurality of units to be coated, means located adjacent the undersurface of the upwardly directed length of the belt for passing a draft of drying air through the belt and through the tumbling units thereon, means for imparting movement to the belt including said rotary members, the concave portion of the upper inclined length of the belt being abutted by spaced flanged disks mounted for rotational movement, each engaging an upper margin of the belt.

9. A coating apparatus adapted for confections constructed in accordance with claim 8, in combination with means for reversing the direction of movement of the belt carrier for discharging any treated confection units from the chamber.

PENROSE R. HOOPES.